(12) United States Patent
Lando

(10) Patent No.: US 7,064,455 B2
(45) Date of Patent: Jun. 20, 2006

(54) FIXED FREQUENCY ELECTRICAL GENERATION SYSTEM AND CORRESPONDING CONTROL PROCEDURE

(75) Inventor: Jean-Louis Lando, Saverdun (FR)

(73) Assignee: Airbus France, Toulouse (FR)

( * ) Notice: Subject to any disclaimer, the term of this patent is extended or adjusted under 35 U.S.C. 154(b) by 71 days.

(21) Appl. No.: 10/937,425

(22) Filed: Sep. 10, 2004

(65) Prior Publication Data

US 2005/0180862 A1 Aug. 18, 2005

(30) Foreign Application Priority Data

Sep. 11, 2003 (FR) ................................ 03 50525

(51) Int. Cl.
*H02P 9/04* (2006.01)
(52) U.S. Cl. .................... 290/1 C; 290/4 C; 322/29
(58) Field of Classification Search ................ 290/1 R, 290/2 C, 4 C, 6; 322/14, 29
See application file for complete search history.

(56) References Cited

U.S. PATENT DOCUMENTS

| 4,246,531 | A | | 1/1981 | Jordan | |
|---|---|---|---|---|---|
| 4,572,961 | A | * | 2/1986 | Borger | 290/4 R |
| 4,609,842 | A | * | 9/1986 | Aleem et al. | 310/112 |
| 4,625,160 | A | * | 11/1986 | Hucker | 322/32 |
| 4,868,406 | A | * | 9/1989 | Glennon et al. | 290/4 R |
| 4,965,477 | A | * | 10/1990 | Stadler et al. | 310/114 |
| 6,543,588 | B1 | * | 4/2003 | Raad | 188/267 |
| 6,998,723 | B1 | * | 2/2006 | Kong et al. | 290/1 C |
| 2003/0085691 | A1 | | 5/2003 | Yao | |

FOREIGN PATENT DOCUMENTS

| GB | 700 036 | 11/1953 |
|---|---|---|
| GB | 975 102 | 11/1964 |
| JP | 59-11798 | 1/1984 |
| WO | WO 88/06378 | 8/1988 |

\* cited by examiner

*Primary Examiner*—Nicholas Ponomarenko
(74) *Attorney, Agent, or Firm*—Oblon, Spivak, McClelland, Maier & Neustadt, P.C.

(57) ABSTRACT

The invention relates to a fixed frequency electrical generation system that can be placed at the variable load engine output, which includes:
an initial stage (30), which is a permanent magnet generator that provides energy to said system, making it autonomous,
a secondary stage (21,) which is an excitation stage that controls the magnetisation of a third stage,
this third stage (24,) which is a main generator, is the electrical energy production power stage.

10 Claims, 6 Drawing Sheets

FIXED FREQUENCY ELECTRICAL GENERATION SYSTEM AND CORRESPONDING CONTROL PROCEDURE

TECHNICAL FIELD

The invention relates to a fixed frequency electrical generation system and the corresponding control procedure.

STATUS OF THE PRIOR ART

The field of the invention is that of alternating electrical generation systems on board aircraft. Nevertheless, it is also that of electrical energy production from a variable load mechanical source.

Aeroplanes are often equipped with alternators that produce constant-frequency alternating current.

One of the main advantages of constant-frequency alternating current with respect to variable frequency current is its ease of use for consumers. On the other hand, its production requires a more complicated technique. Indeed, obtaining a constant frequency requires manufacturers to provide for a constant speed drive system. The most widely used constant frequency is 400 Hz.

FIG. 1 illustrates the generation of such a fixed frequency alternating current with:
located between the engine 8 and the bus 9:
a constant speed drive block 10,
an alternating block 11,
a line relay 12,
and an adjustment device 13 linked to each of these three elements 10, 11, 12 and to the line relay input 12.

Constant Speed Drive Block 10

In FIG. 1, the constant speed drive block 10 is distinct from the alternating block 11. Indeed, both of these two elements constitute a set generally fixed in the lower area of the engine 8 to which it is attached.

This constant speed drive block 10, referred to by its acronym CSD ("Constant Speed Drive,") is a device whose input shaft is driven at a varying speed with the engine load, and whose output shaft delivers a constant speed. This output shaft therefore drives the alternating block 11 at a constant speed, and therefore at a constant frequency because f=p N
where:
f=frequency,
p=number of pairs of poles of the alternator 11,
N=number of rotations/second of the alternator's 11 rotor.

Generally, a variation range of the input speed is fixed, within which a constant speed can be output.

The constant speed drive block 10 includes:
a cylinder block,
a hydraulic differential.

The cylinder block is composed of a pump and a cylinder engine that are placed end-to-end. The engine has a fixed plate whilst the pump has a variable pitch plate. Controlling the pitch of the plate allows varying the speed of the engine shaft, as well as choosing its rotation direction.

The hydraulic differential is composed of two planetary gears and two satellite gears. The input shaft holds the two planetary gears and drives the rotation of the hydraulic pump that powers the engine. The engine drives the rotation of the speed adjustment satellite gears. The output satellite gears drive the alternator's rotor.

When the speed of the input shaft varies, the variable pitch plate of the pump is positioned so that it adjusts the speed of the alternator's rotor by varying that of the adjustment satellite gears. If the input speed is insufficient, rotations/min are added. When the speed is too high, rotations/min are removed by reversing the engine's rotation direction. When the input load is matches the desired load, the vertical position plate and the differential cease to rotate.

Alternating Block 11

The alternator includes three switchgears that are strapped on:
a main alternator;
an exciter;
a permanent magnet generator (PMG.)

The PMG, the exciter, and the alternator each have their own rotor. The three rotors are integrated into the same shaft and are therefore driven at the same speed.

The PMG rotor includes permanent magnets. When this rotor is rotated, the electrical energy from the stator terminals can be collected without providing any excitation. This rectified electrical current is sent to the exciter inductor stator via a generator control unit. Therefore, at the exciter rotor terminals, an alternating current is collected, which, rectified by the diodes housed in the common drive shaft (rotating diodes,) allows exciting the alternator.

Regulating Device 13

This voltage regulator allows maintaining an output voltage at a constant mean square value.

The alternator is over-excited when the voltage decreases, or is under-excited when the voltage increases. For this purpose, the output voltage of the alternator is compared to a reference voltage, the deviation is amplified, and a proportional current allows modifying the excitation and the electromotive force of the alternator.

Different prior art systems allow generating constant frequency current. These systems have several drawbacks:

The IDG (Integrated Drive Generator) by the Hamilton-Sundstrand Company consists in integrating a CSD (Constant Speed Drive) and a three-phase, three-stage alternator within a single enclosure. The CSD is used to adjust the mechanical speed for driving the alternator in order to generate a fixed frequency at 400 Hz. The mean square output voltages are adjusted to 115 V. This generator has several drawbacks: High purchase price, high maintenance cost, quality of essential oil, elevated weight, low efficiency, mediocre reliability, performance that depends on the wear-and-tear status of the large CSD exchanger (impact engine,) non-reversible system.

The VSCF (Variable Speed Constant Frequency) generator made by the Hamilton-Sundstrand Company consists in associating a VFG (Variable Frequency Generator) and a variable/fixed frequency type electrical energy static converter. This system often requires the creation of two electrical networks: One fixed frequency network and one variable frequency network, in order to maintain reasonable weight and reliability values. This generator has several inconveniences: High purchase price, elevated weight due to the presence of a static converter and power lines sized for 760 Hz, mediocre efficiency at fixed frequency, low reliability of the inverter static converter proportional to the power level, low power at fixed frequency, non-reversible system.

PRESENTATION OF THE INVENTION

The purpose of the invention is to allow supplying any current electrical charge in the form of three-phase voltages with a constant mean square value and constant frequency, regardless of the engine load included between limit speeds, which are, for an aircraft, "Ground Idle speed" and "Take-off Speed," with greater reliability than that of the prior art systems.

Another purpose of the invention is to allow using an asynchronous engine for performing the engine start-up to which it is attached.

The invention suggests a fixed frequency electrical generation system that can be placed at the variable load engine output, characterised in that it includes:

an initial stage, which is a permanent magnet generator that provides energy to said system, making it autonomous, a secondary stage, which is an excitation stage that controls the magnetisation of a third stage, this third stage, which is a main generator, is the electrical energy production power stage, and in that the rotors of the exciter and the main generator are integrated into a first shaft; the stator of the main generator supplies the output voltage; the rotor of the permanent magnet generator is integrated into a second shaft; at least one oil pump of the cooling circuit is integrated into a third shaft; these three shafts are driven by an input shaft, which is the engine shaft, via gears.

Advantageously:

the permanent magnet generator rotor is driven directly (no CSD) by the engine shaft, and its stator powers an external control unit, the stator of the exciter is powered by variable frequency three-phase currents from a three-phase current inverter of said external control unit, the rotor of the main generator is integrated into that of the exciter and is driven by the engine shaft, its three-phase rotor windings are directly interconnected (no rectifier) to those of the exciter, In an operating mode in synchronous generation, the input shaft is driven in variable load; said system converts the mechanical input energy into electrical energy to rectify it in the form of three-phase voltages and currents to the stator of the main stage, which are then distributed over an alternating current network.

In an operating mode with an asynchronous engine, the stator of the main stage is powered by three-phase voltages and the stator of the exciter is short-circuited; the energy absorbed is electrical and the energy generated is mechanical.

The invention also relates to a control procedure of said system in the case of synchronous generation operation.

In a first mode, in which the voltage to the stator of the main stage is controlled, this procedure includes two adjustment loops:

an excitation current loop;
an output voltage loop.

In a second mode, in which the frequency of the system is controlled, this procedure includes:

an excitation frequency loop;
an output frequency loop.

The generator of the invention has the following advantageous characteristics:

It does not include a CSD (Constant Speed Drive) or rotating diodes: Its rotor is directly driven by the variable load engine. The rotor winding of the exciter and of the main generator are directly interconnected. It produces a fixed frequency.

The rotor of the main generator is powered by variable frequency three-phase currents that depend on the mechanical drive load: The rotor field of the main generator is a rotating field with respect to an observer located on the rotor.

The stator armour of the exciter is powered by variable frequency three-phase currents that depend on the mechanical drive load. The stator field of the exciter is a rotating field with respect to an observer located on the rotor.

Variable frequency three-phase currents that power the stator of the exciter are generated by a three-phase voltage inverter located in the control unit (GCU or Generator Control Unit.)

It results in the following advantages:

simplicity and good reliability,
low maintenance costs,
good efficiency,
low weight,
possibility of operation on starter.

The system of the invention can be used in the following fields:

main, auxiliary, and backup generation in aircraft,
renewal of existing fleets of aircraft to increase reliability and financial benefits,
opening to the competition in the field of fixed frequencies.

DETAILED PRESENTATION OF SPECIFIC EMBODIMENTS

The fixed frequency generation system of the invention is an electromechanical converter that allows powering any type of electrical charge into energy, in the form of mean square value and constant frequency three-phase voltages, from a variable load mechanical source.

Figure 2:
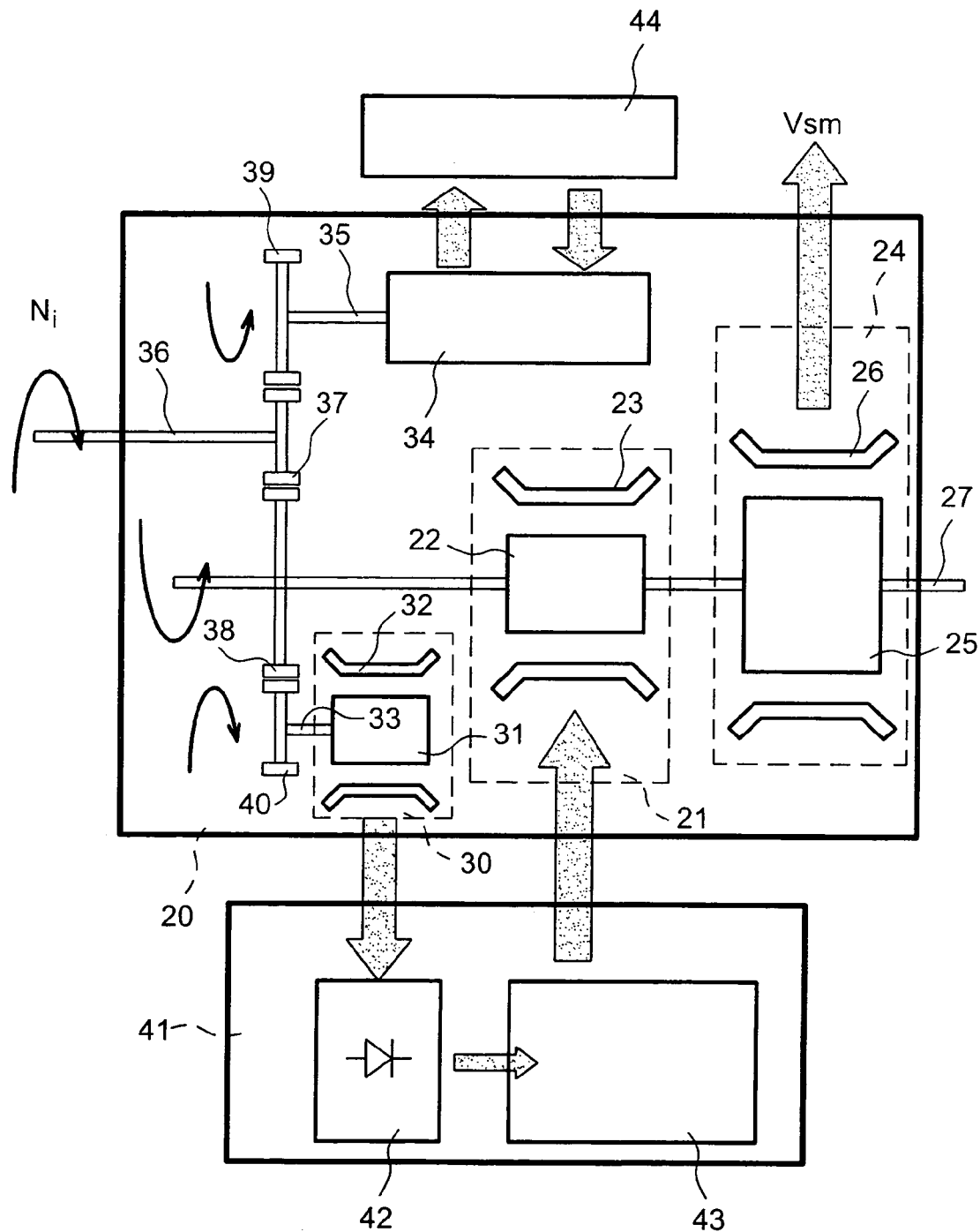
FIG. 2 illustrates the fixed frequency electrical generation system of the invention.

The topology of this system 20 is based on a three-stage system, as illustrated in FIG. 2:

an initial stage 30 called "permanent magnet generator" (PMG) that supplies electrical energy that allows the system to be autonomous, a second excitation stage 21, called "exciter," that is used to control the magnetisation of a third stage 24, this third stage 24, called "main generator," is the electrical energy production power stage.

An oil pump 34 connected to a heat exchanger 44, allows cooling the system.

A set of gears 37, 38, 39, and 40 allows rotating the rotor 25 of the main generator 24 at a ratio adapted according to the application. The same is true as regards to the exciter 21, the permanent magnet generator 30, and the oil pump 34 of the cooling circuit. The system is controlled by a "real time" electronic device based on a microprocessor architecture or DSP (Digital Signal Processor.) This principle of a three-stage generator allows avoiding bushing or brush type connections in order to ensure reliability. Furthermore, this system does not include a CSD (Constant Speed Drive) or rotating rectifier.

The system 20 is composed so that:

the rotors 22 and 25 of the exciter 21 and the main generator 24 are integrated into a first shaft 27; the stator 26 of the main generator 24 provides the output voltage $V_{sm}$, the rotor 31 of the permanent magnet generator 30 is integrated into a second shaft 33, at least one oil pump of the cooling circuit 34 is integrated into a third shaft 35.

These three shafts 27, 33, and 35 are driven by the input shaft 36, which is the shaft of the engine, via gears 37, 38, 39, and 40.

A heat exchanger 44 is input- and output-linked, to the oil pump of the cooling circuit 34.

A control unit 41, which includes a rectifier element 42 followed by a three-phase inverter 43, is input-linked to the stator 32 of the permanent magnet generator 30 and output-linked to the stator 23 of the exciter 21.

Figure 1:
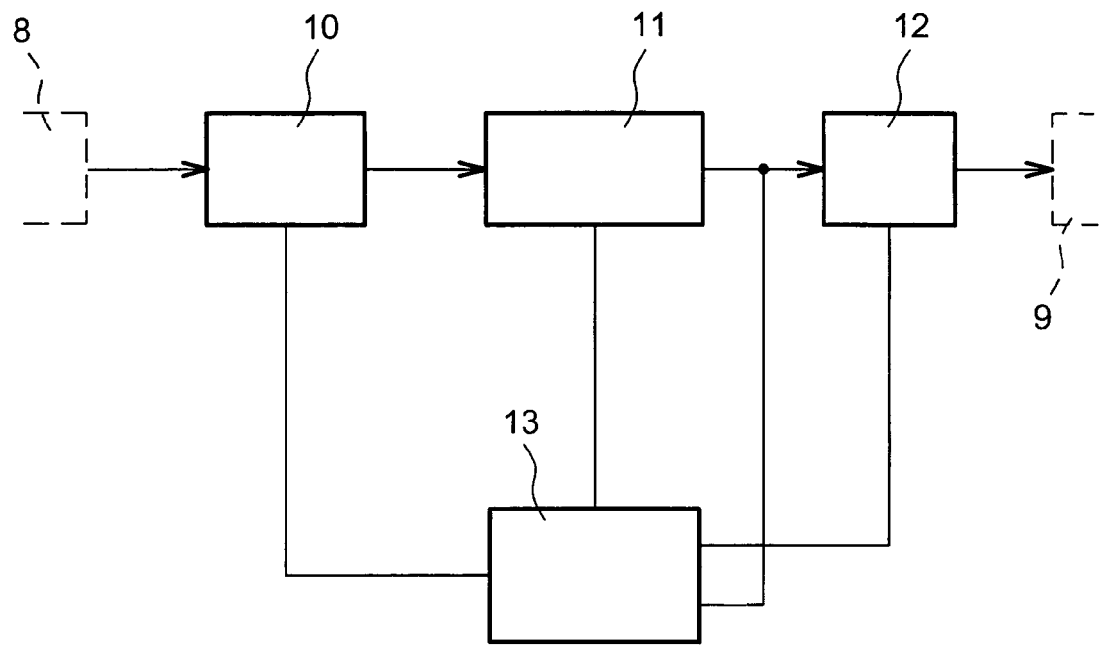
FIG. 1 illustrates an alternating current generator of the prior art.
Figure 3:
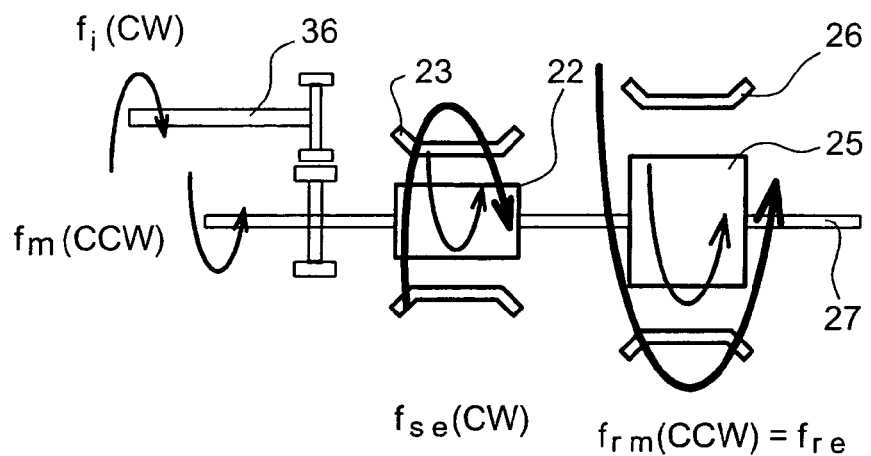
FIG. 3 illustrates the operation of the system of the invention.

FIG. 3 indicates the general topology of the system of the invention. For the purpose of simplifying the description, it is assumed that all the windings are bipolar and three-phase. The principle remains valid in the general case of multipolar and/or polyphase windings; in addition, the rotation direction of the input shaft can be clockwise (CW) or counter-clockwise (CCW.) The rotors 22 and 25 of the exciter 21 and the main generator 24 are integrated into the main shaft 27 and house three-phase windings. These windings are directly interconnected. The main shaft 27 and the input shaft 36 each engage with a speed ratio adapted to the application. The stator winding 23 of the exciter 21 is used to produce the excitation field of the system, the stator winding 26 of the main generator 24 is the electrical energy production power stage.

The following quantities are available:

$f_i$: revolution frequency of the input shaft (36)
$f_m$: revolution frequency of the main shaft (27)
$f_{re}$: frequency of the exciter rotor (22)
$f_{se}$: frequency of the exciter stator (23)
$f_{rm}$: frequency of the main generator rotor (25)
$f_{sm}$: frequency of the main generator stator (26)

The input shaft 36 is driven by variable load in the clockwise direction (CW) at frequency $f_i$. Consequently, the main shaft 27 turns at frequency $f_m$ in the reverse direction (CCW.) Hypothetically, the stator winding 23 of the exciter 21 is powered by three-phase currents so that a rotating magnetic field is generated (Galileo Ferraris theorem.) The instantaneous frequency of this field is $f_{se}$ and its maximum amplitude is $H_e$, both of which are controlled.

To an observer placed on the rotor winding 22 of the exciter 21, the frequencies are combined in order to generate three-phase electromotive forces (Faraday law) with a maximum amplitude $E_{re}$ proportional to the maximum amplitude He and frequency $f_{re}=f_m+f_{se}$.

In principle, the rotor windings 22 of the exciter 21 are electrically and directly interconnected to the rotor windings 25 of the main generator 24. Thus, the three-phase electromotive forces available to the rotor 25 of the exciter 21 generate three-phase currents that cross the rotor windings 25 of the main generator 24. The maximum amplitude $I_{rm}$ of these currents is proportional to the amplitude $E_{re}$. The frequency of these currents $f_{rm}$ and the frequency of the electromotive forces at the source $f_{re}$ are therefore equal: $f_{rm}=f_{re}$.

To an observer placed on the rotor 25 of the main generator 24, the rotor 25 is immobile but it is the seat of a rotating magnetic field with a revolution frequency $f_{rm}$ and amplitude $H_m$ proportional to $I_{rm}$.

To an observer placed on the stator 26 of the main generator 24, the rotor 25 mechanically turns counter-clockwise (CCW) at a revolution frequency $f_m$. A magnetic field is superimposed on this movement and which, in turn, rotates with respect to the rotor 25, also in counter-clockwise direction at a frequency form. At the stator 26, the magnetic field that results from this combination is a field that rotates counter-clockwise at a frequency $f_{sm}$ equal to the sum of the two frequencies: $f_{sm}=f_m+f_{rm}$. The stator windings 26 of the main generator 24 are therefore the seat of the three-phase electromotive forces with a maximum amplitude $E_{sm}$ proportional to $H_m$ and with a frequency $f_{sm}$.

A three-equation system is obtained:

$$f_{re}=f_m+f_{se}$$

$$f_{rm}=f_{re}$$

$$f_{sm}=f_m+f_{rm}$$

The solution of this system provides the following:

$$f_{sm}=2 \cdot f_m+f_{se}.$$

Hypothetically, the revolution frequency $f_{se}$ of the stator rotating field of the exciter 21 can be obtained as follows:

$f_{se}=f_{ref}-2 \cdot f_m$. Frequency $f_{ref}$ is the electrical frequency to be obtained and maintained constant.

Therefore, the following is obtained:

$$f_{sm}=2 \cdot f_m+f_{se}=2 \cdot f_m+(f_{ref}-2 \cdot f_m) \Rightarrow f_{sm}=f_{ref}$$

With this excitation rule, the system of the invention can generate three-phase electromotive forces with a mean square value $E_{sm}$ and a constant frequency equal to $f_{ref}$, regardless of the driving load $f_m$. The frequency deviation is composed by carefully selecting the frequency of the excitation field $f_{se}$ and adjusting it in real time. The exciter 21 plays a double role: The excitation (adjustment of $E_{sm}$) and the frequency compensation (adjustment of $f_{se}$ so that $f_{sm}=f_{ref}$.) In addition, the power required at the stator 23 level of the exciter 21 is negligible with respect to that provided at the power stage (main generator 21,) converted from the mechanical input.

Operating Modes

Figure 4:
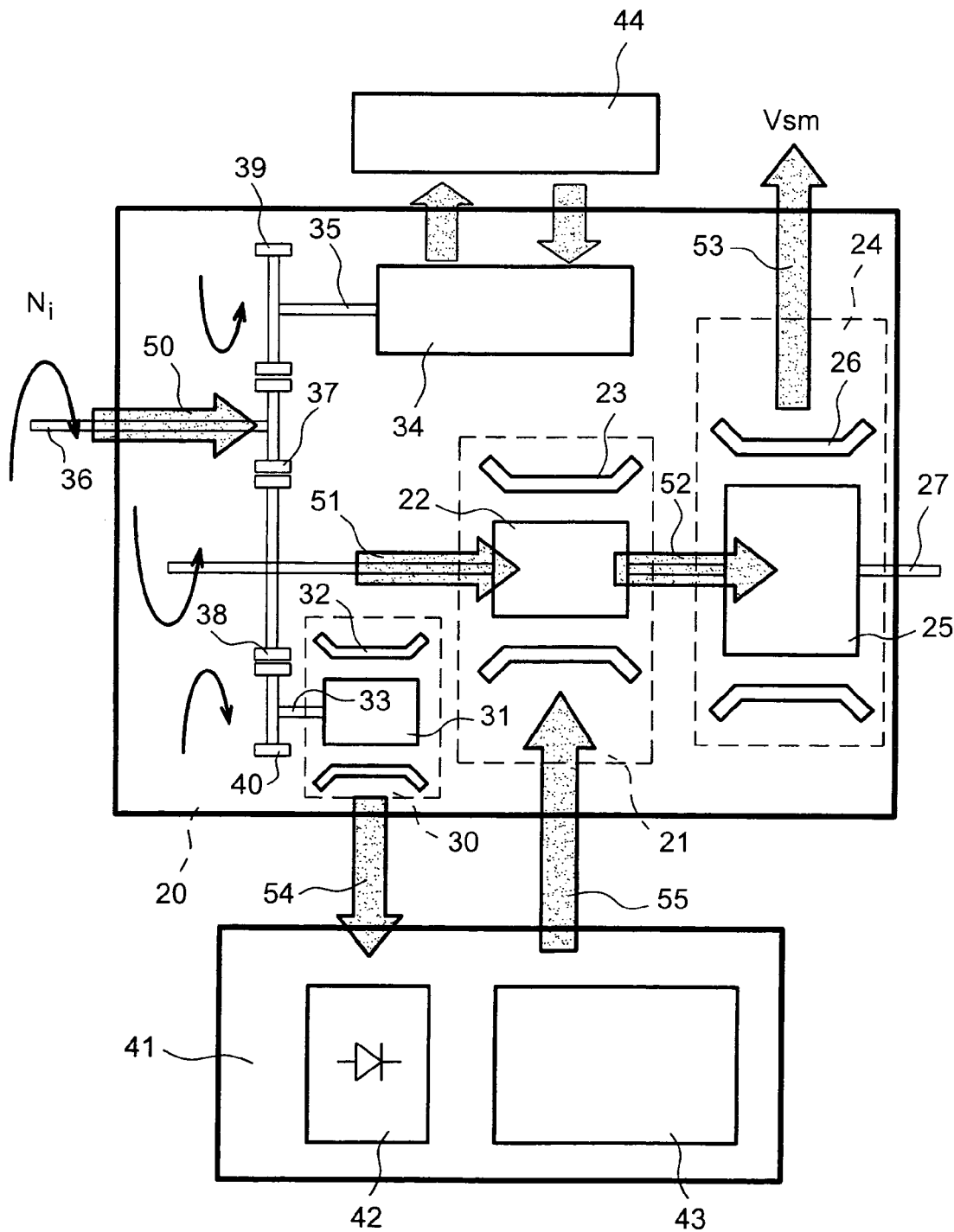
FIG. 4 illustrates the operation of the system of the invention in synchronous generation.

Insomuch as the system of the invention does not include any unidirectional elements in its construction (no diodes,) it is naturally reversible. Therefore, there are two operating modes; engine and generator:

When the mechanical shaft 27 is rotated and the system is excited, the energy absorbed is mechanical and the energy generated is electrical. Three voltages appear at the stator 26 of the main stage, in which the frequency is equal to the frequency of the field that generates them. If electrical loads are present, three three-phase currents are supplied by the stator 26 of the main stage 24: This is a synchronous generation (or alternator) operation, as illustrated in FIG. 4.

Figure 5:
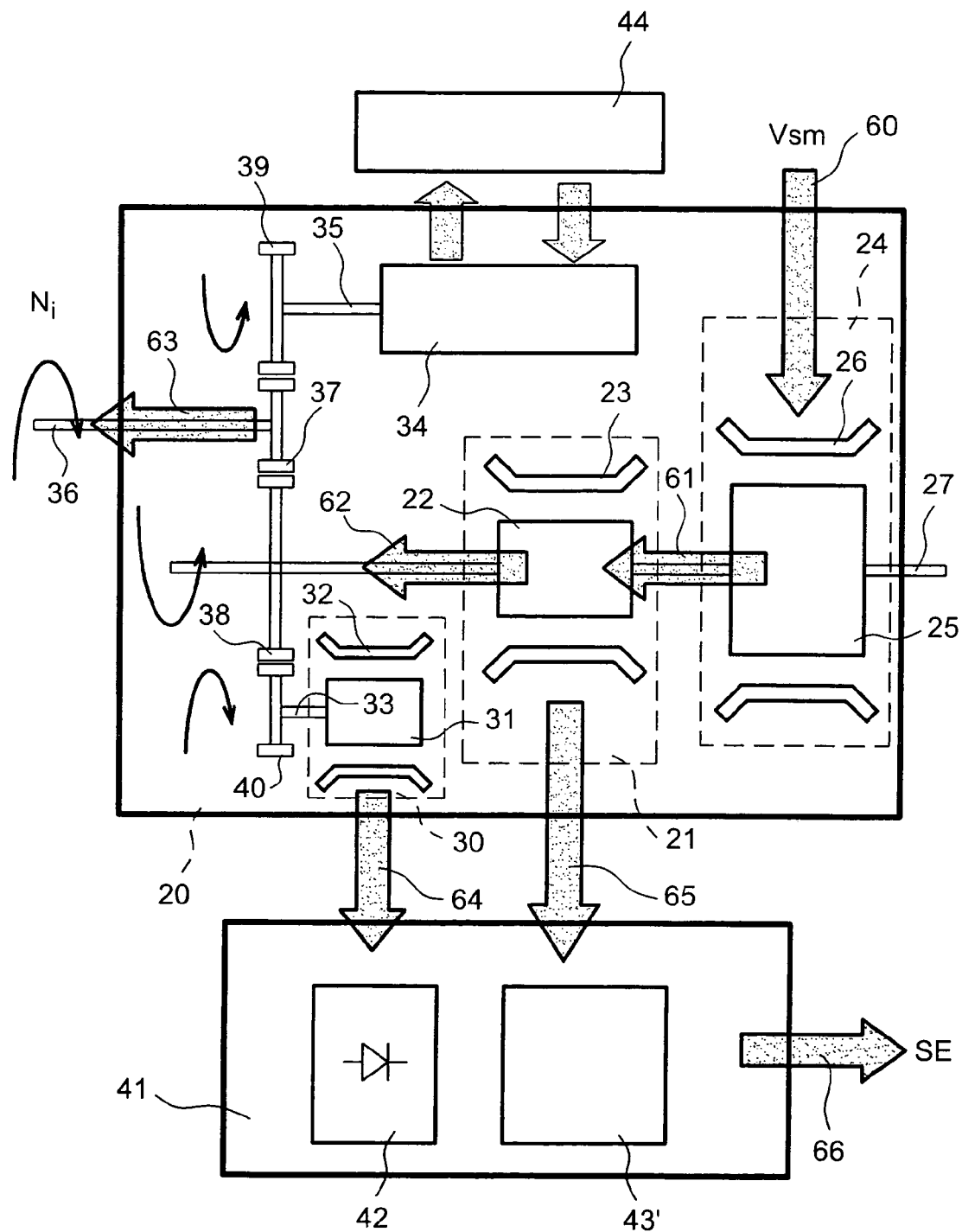
FIG. 5 illustrates the operation of the system of the invention in asynchronous engine.

When the stator 26 of the main stage 24 is powered by three-phase voltages and the stator 23 of the exciter 21 is short-circuited, the energy absorbed is electrical and the energy generated is mechanical, and the rotor 22 begins to rotate spontaneously. The rotation frequency of the mechanical shaft 27 is always less than or equal to that of the stator field: This is an asynchronous engine operation, as illustrated in FIG. 5.

The system of the invention can be controlled using scalar equations because the frequency of the interference modes is insignificant with respect to other modes. Corrections can be made to the system regarding average quantity values.

In a synchronous generation type operation, interference (unexpected) is the frequency $f_i$ of the input shaft 36 and the load current $f_{sm}$ of the generator 24. The quantities to be adjusted are the mean square value of the voltage $V_{sm}$ and the frequency $f_{sm}$ of the power stage of the system of the invention. The control quantities are the maximum value of the excitation current $I_{se}$ and its frequency $f_{se}$. In such a device, interference is "slow" with respect to the quantities to be adjusted. Indeed, in an aeronautical application, the mechanical inertia of the reactor is elevated and the mechanical frequency $f_i$ of the input shaft 36 slowly varies with respect to other quantities. Furthermore, due to the inductive effects of the electrical network, load current variations remain "slow."

Synchronous Generation Operation

In a synchronous generation operation, as illustrated in FIG. 4, the direction of the energy transfer is indicated using arrows 50 to 55. The input shaft 36 is driven in variable load by a mechanical energy source (reactor accessory control unit.) This mechanical energy is converted into electrical energy by the system of the invention, which restores it in the form of three-phase voltages and currents to the stator 26 of the main stage 24, and which are then distributed over the alternating current network (3×115 V-AC/400 Hz.) The mean square value and frequency of these voltages are controlled by an action on the excitation current $I_{se}$. The stator 23 of the exciter 21 is powered by a three-phase inverter 43 that allows controlling, in real time, the maximum amplitude of the excitation current $I_{se}$ and its instantaneous frequency $f_{se}$. The energy sources for powering the set of electronic control devices, including the primary voltage source E of the inverter 43, are supplied in an autonomous manner from the PMG generator 30 and rectifier devices 42 at the control calculator 41 level.

Figure 6:
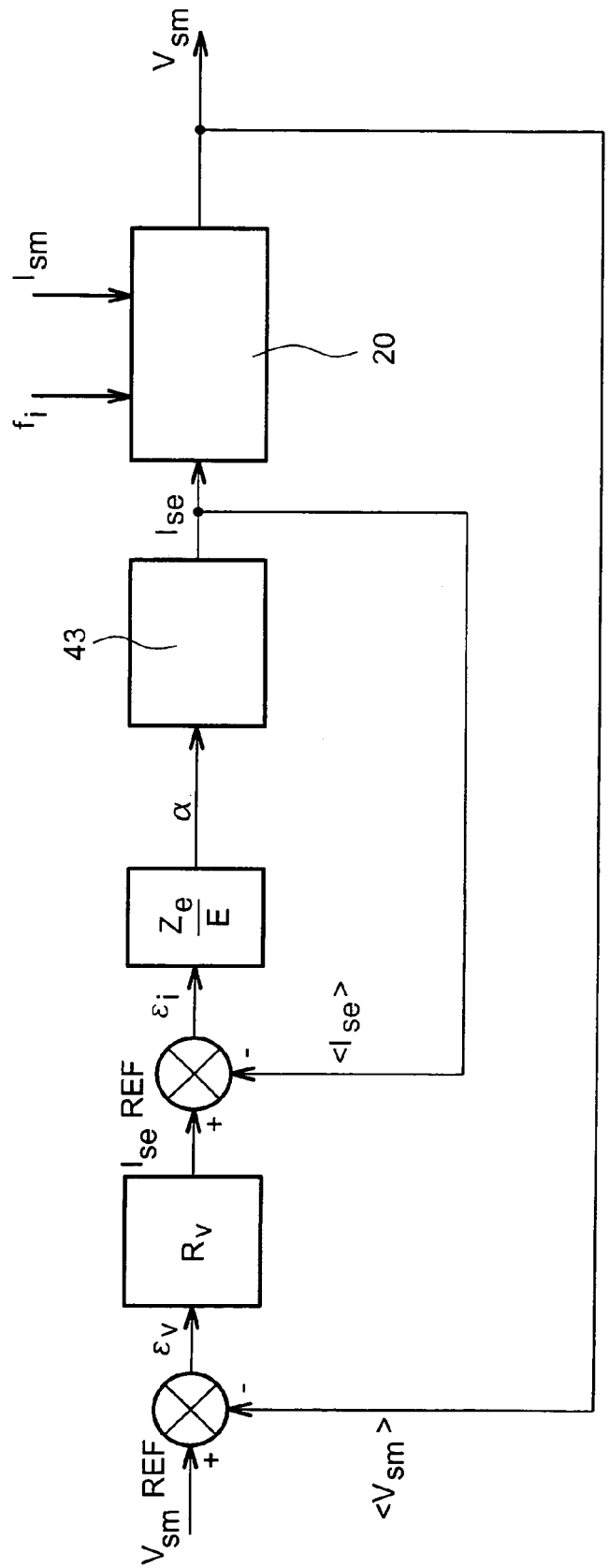
FIGS. 6 and 7 illustrate, respectively, a procedure for controlling the voltage and a procedure for controlling the frequency of the system of the invention, in the case of synchronous generation operation as illustrated in FIG. 4.

FIG. 6 represents a closed loop block diagram of a control procedure of the voltage $V_{sm}$ of the system to be controlled, which in fact, constitutes two sub-systems: The electrical generator 20 and the three-phase inverter 43 that powers it.

For the "generator" sub-system 20, the output quantity to be controlled is the voltage $V_{sm}$ at the stator 26 of the main stage 24, whilst the quantity to be controlled at the input is the maximum value $I_{se}$ of the current at the stator 23 of the exciter 21. Two other quantities are applicable within this sub-system 20: The mechanical rotation frequency $f_i$ of the input shaft 36 and the load current $I_{sm}$ of the generator 24. These two latter quantities can be measured but not controlled: This is interference.

For the "inverter" sub-system 43, the output quantity to be controlled is the excitation current $I_{se}$ at the exciter 21 input, whilst the control quantity on input is the cyclical ratio $\alpha$ of the inverter 43 (for example, $0 \leq \alpha \leq +1$.) The interference of this sub-system is the power supply voltage E of the inverter 43 that, being produced at a variable frequency by the PMG stage 30, will depend on the driving load and, consequently, cannot be controlled.

The control procedure of the voltage $V_{sm}$ is composed of two adjustment loops: An "excitation current: $I_{se}$" loop and an "output voltage $V_{sm}$" loop.

As regards to the "$I_{se}$" loop, the cyclical ratio $\alpha$ is calculated from the instantaneous different $\epsilon i$ between the reference excitation current Ise REF and the real "$I_{se}$" excitation current measured by a sensor. In this loop, the calculation parameters are the input impedance $Z_e$ of the stator 23 of the exciter 21 and the power supply voltage E of the inverter 43.

As regards to the "$V_{sm}$" loop, the reference current $I_{se}$ REF of the inverter 43 is calculated from the instantaneous difference $\epsilon_v$ between the reference voltage $V_{sm}$ REF (for example, 115 V) and the real output voltage "$V_{sm}$" measured using a sensor. The performance of the procedure is adjusted using the Rv block (correction network.)

This procedure allows obtaining an output voltage $V_{sm}$ that is maintained equal to the reference voltage $V_{sm}$ REF, regardless of the status of the external interference fi and $I_{sm}$.

Figure 7:
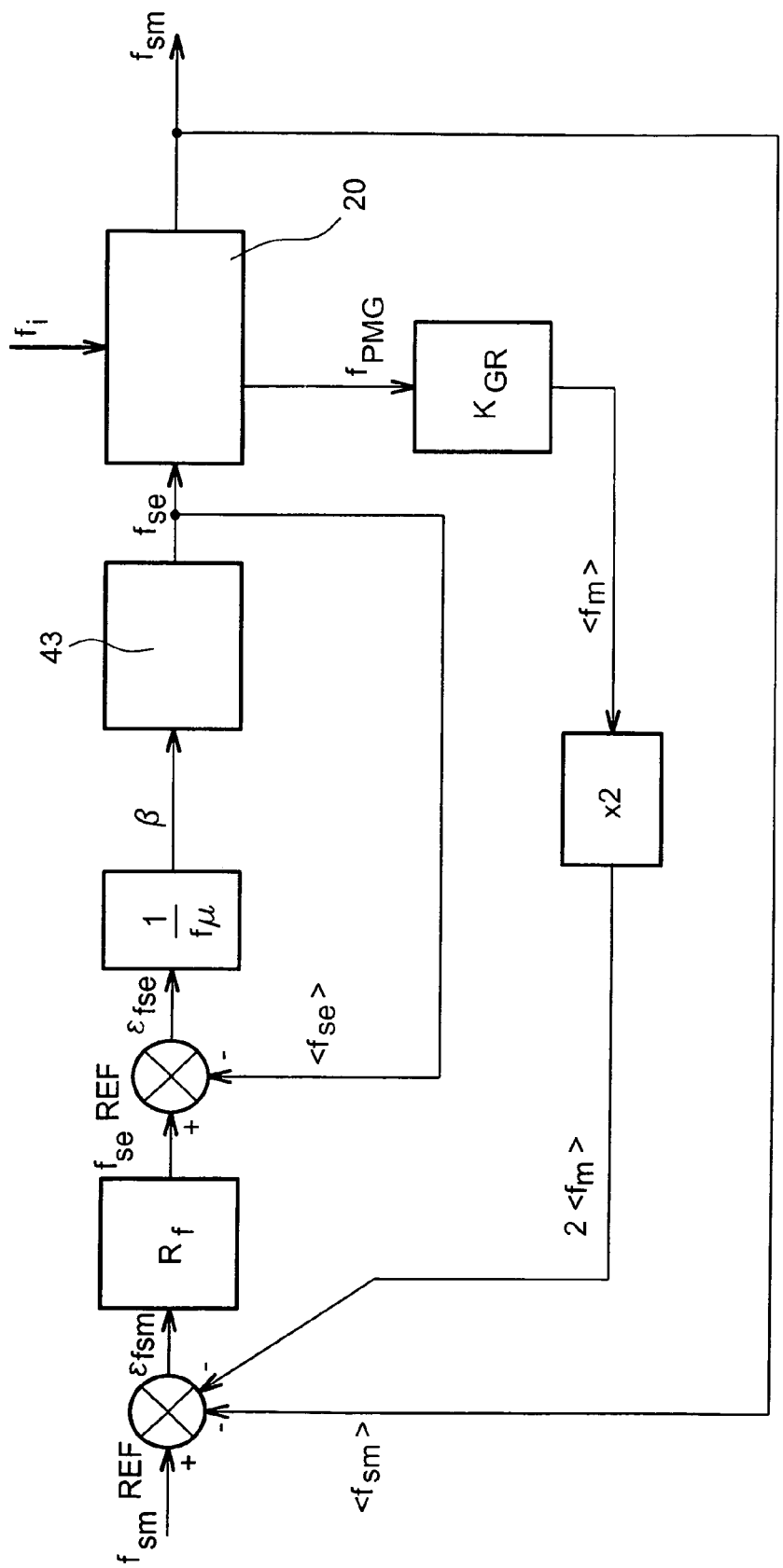

FIG. 7 represents a closed loop (BF) block diagram of a procedure for controlling the frequency $f_{sm}$ of the system to be controlled. As indicated above, the system to be controlled is composed of two sub-systems "generator" 20 and "inverter" 43.

For the "generator" sub-system 20, the output quantity to be controlled is the frequency $f_{sm}$ at the stator 26 of the main stage 24, whilst the control quantity on input is the frequency $f_{se}$ of the current at the stator 23 of the exciter stage 21. The interference of this sub-system 20 is the mechanical rotation frequency $f_i$ of the input shaft 36.

For the "inverter" sub-system 43, the output quantity to be controlled is the excitation current frequency $f_{se}$ at the exciter 21 input, whilst the control quantity on input is the modulation ratio $\beta$ of the inverter 43 (for example, $-0.25 \leq \beta \leq +1.25$.) This parameter $\beta$ is equal to the instantaneous excitation frequency ratio $f_{se}$ at the modulation frequency $f_\mu$ ($f_\mu = f_{se}(n_i = \text{idle})$.)

The control procedure of the frequency $f_{sm}$ is composed of two adjustment loops: An "excitation frequency: $f_{se}$" loop and an "output frequency: $f_{sm}$" double loop.

As regards to the "$f_{se}$" loop, the modulation ratio $\beta$ is calculated from the instantaneous different $\epsilon f_{se}$ between the reference excitation frequency $f_{se}$REF and the frequency of the excitation current $<f_{se}>$ calculated from the real time measurement of $I_{se}$ (voltage control procedure.) In this loop, the calculation parameter is the modulation frequency $f_\mu$.

As regards to the "$f_{sm}$" loop, the reference frequency $f_{se}$REF of the inverter is calculated from the instantaneous different $\epsilon f_{sm}$ between the reference frequency $f_{se}$REF (for example 400 Hz,) the double 2×<fm> of the instantaneous frequency of the rotor's mechanical rotation (measured from the voltages supplied by the PMG stage 30 and the gear ratio $K_{GR}$,) and lastly, the real output frequency <fsm> of the generator 24 calculated from the real time measurement of $V_{sm}$ (voltage control procedure.) The performance of the system is adjusted using the $R_F$ block (correction network.)

This procedure for controlling the frequency allows obtaining an output frequency $f_{sm}$, which is maintained equal to the reference frequency $f_{sm}$REF, regardless of the status of external interference $f_i$.

Asynchronous Engine Operation

In an asynchronous engine operation, as illustrated in FIG. 5, the direction of energy transfer is indicated using arrows 60 to 66. It is reversed with respect to a generator operation. The stator 26 of the main stage 24 is powered by a three-phase voltage system from an electrical power source that is external to the device (3×115V-AC/400 Hz: Ground power unit or APU generator.) Part of the electrical energy thus injected in the system 20 is extracted from the stator 23 of the exciter 21 in the form of three-phase currents. This energy can either be disseminated in the form of Joules (minor solution) or converted and re-injected into a reversible electrical source SE (for example: Direct current network 28V-DC,) in a controlled manner and using a low-power static converter. The rest of the energy; that is, the largest amount, is converted into mechanical form by rotating the input shaft 36. In the case of recovery in a direct current network, the control of the cyclical ratio γ of the direct current converter 43' allows controlling the call current $I_{sm}$ over the external power source during the start-up sequence.

Examples of Use of the System of the Invention

The system of the invention can be used, in particular, on aircraft as a main generator, an auxiliary generator, or a backup generator.

For example, the system of the invention can be mounted on the generator control unit of a turbo-fan whose load on the input shaft of the generator varies between 4500 RPM (engine slow-down on ground, $f_i$=75 Hz) and 9000 RPM (maximum frequency on take-off, $f_i$=150 Hz.) With respect to gears of 1.333, a mechanical frequency at the rotor 25 of the system is obtained such as: 100 Hz≦$f_m$≦200 Hz during normal load.

If voltages are generated at a frequency of $f_{sm}$=400 Hz, the excitation control rule must be as follows:
  at engine slow-down ($f_m$=100 Hz): $f_e$=200 Hz
  at take-off ($f_m$=200 Hz): $f_e$=0 Hz
  at a given load between 4500 and 9000 RPM ($f_m$=400 ψ; 0.25≦ψ0.50): $f_e$=400 (1−2 ψ.)

This excitation rule allows correctly generating a constant frequency at 400 Hz over a range of 4500–9000 RPM.

Main Generation

If used as a main generator, the system of the invention is coupled to the generator control unit and is mechanically driven by the engine. Under normal operation, the system of the invention behaves like a synchronous generator (three-phase alternator.)

If for whatever reason, the driving load exceeds the 9000 RPM threshold (engine over-speed,) the system of the invention can still be controlled, as long as the rotation direction of the excitation field (fse<0) is inverted in order to slow down field $H_m$ with respect to the frequency of the rotor 25.

Insomuch as the system of the invention is reversible by its configuration (no unidirectional elements,) it can be used as an electrical engine to start the aircraft engine. To obtain an asynchronous engine operation mode, the stator 23 of the exciter 21 must be short-circuited in a controlled manner, or the energy on the electric network must be transferred in a controlled manner using a static converter. Furthermore, the stator 26 of the main generator 24 must be powered by the three-phase alternating current network. The transfer direction of energies is reversed.

Backup Generation

If used as a backup generator, the system of the invention is coupled to a wind turbine (variable step turbine.) If the main generators are lost, this set is deployed outside the aircraft and rotated by the speed of the air. At such time, the system of the invention ensures the availability of the aircraft's essential systems.

Auxiliary Generation

If used as an auxiliary generator, the system of the invention can be used to power the aircraft on the ground, with the engines off. It can also be used to start the APU (Auxiliary Power Unit) generator in an engine operation.

The invention claimed is:

1. Fixed frequency electrical generation system that can be placed at the variable load engine output, characterised in that it includes:
   an initial stage (30), which is a permanent magnet generator that provides energy to said system, making it autonomous,
   a secondary stage (21), which is an excitation stage that controls the magnetisation of a third stage,
   this third stage (24), which is a main generator, is the electrical energy production power stage,
   in that the rotors (22 and 25) of the secondary stage (21) and the third stage (24) are integrated into a first shaft (27), the stator (26) of the third stage (24) supplies the output voltage ($V_{sm}$), in that the rotor (31) of the first stage (30) is integrated into a second shaft (33), in that at least one oil pump of the cooling circuit (34) is integrated into a third shaft (35), and in that these three shafts (27, 33, and 35) are driven by the input shaft (36), which is the engine shaft, using gears (37, 38, 39, and 40).

2. System according to claim 1, in which the rotor (31) of the permanent magnet generator (30) is driven by the shaft of the engine (36), and its stator (32) powers an external control unit (41).

3. System according to claim 2, in which the stator (23) of the exciter (21) is powered by variable frequency three-phase currents from a three-phase current inverter (43) of said external control unit (41).

4. System according to claim 3, in which the rotor (25) of the main generator (24) is integrated with the rotor (22) of the exciter (21) and is driven by the shaft of the engine (36); its rotor windings are interconnected with those of the exciter.

5. System according to any of the previous claims, which includes an input shaft (36) that is driven in variable load and that converts the mechanical energy into electrical energy to rectify it in the form of three-phase voltages and currents to the stator (26) of the main stage (24), which are then distributed over an alternating current network.

6. System according to any of claims 1 to 4, in which the stator (26) of the main stage (24) is powered by three-phase voltages and the stator (23) of the exciter (21) is short-circuited; the energy absorbed is electrical and the energy generated is mechanical.

7. System according to any of claims 1 to 4, that includes a static converter that allows transferring the energy on the electrical network in a controlled manner.

8. System control procedure according to claim 5, in which the voltage ($V_{sm}$) is controlled at the stator of the main stage (24), and that includes two adjustment loops:
   an excitation current loop;
   an output voltage loop.

9. System control procedure according to claim 5, in which the frequency of the system is controlled, which includes:
   an excitation frequency loop;
   an output frequency loop.

10. Use of the system of the invention according to claim 1, on an aircraft as an electrical generator and/or electrical engine.

* * * * *